Sept. 23, 1969   R. G. BEST ET AL   3,469,099
COMBINATION X-RAY FILM AND CONNECTING MEANS OF
A BAND OF NON-METALLIC PLIABLE MATERIAL
Filed April 21, 1966   2 Sheets-Sheet 1

INVENTOR
RICHARD G. BEST
FRED M. MEDWEDEFF
BY
ATTORNEY

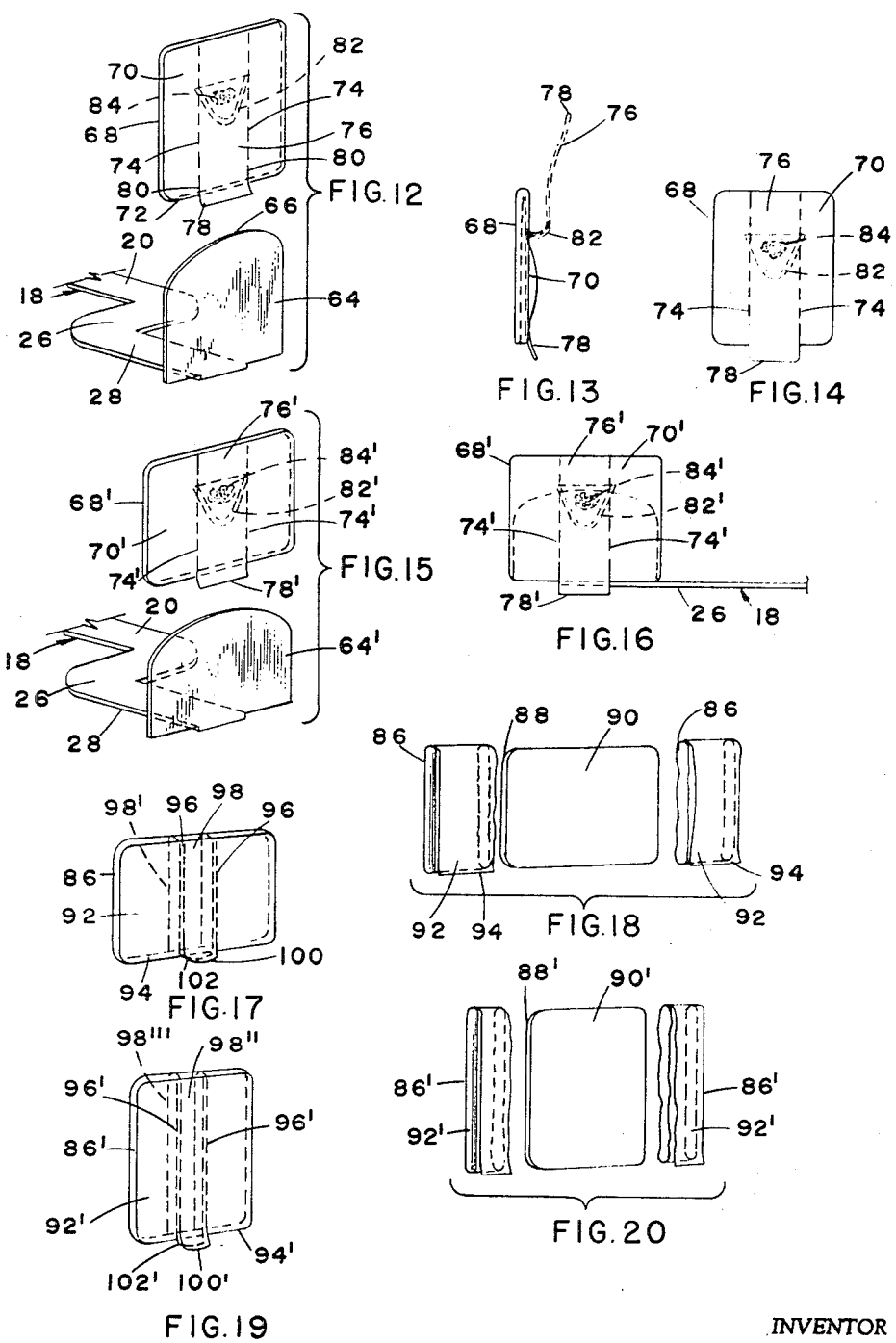

United States Patent Office 3,469,099
Patented Sept. 23, 1969

3,469,099
COMBINATION X-RAY FILM AND CONNECT-
ING MEANS OF A BAND OF NON-METALLIC
PLIABLE MATERIAL
Richard G. Best and Fred M. Medwedeff, Nashville,
Tenn., assignors to Precision X-Ray Company, Nash-
ville, Tenn., a corporation of Tennessee
Filed Apr. 21, 1966, Ser. No. 544,280
Int. Cl. G01n 21/00
U.S. Cl. 250—70
10 Claims

ABSTRACT OF THE DISCLOSURE

A combination dental X-ray film holder and shield comprising a principal metallic shield and aiming device having a substantially central aperture similar in size and shape to an X-ray film, a flat supporting arm fixed to said shield and extending perpendicularly from one edge of said aperture adjacent one side thereof, said arm having a lateral offset adjacent the outer end thereof within the plane thereof and having a terminal extension thereon substantially coaxially of said aperture in said principal shield, and several different embodiments of X-ray films selectively attachable to said support and shield by holding means which essentially are attached at opposite edges to the film and extend around the outer side of the support and shield which is opposite that against which the film is disposed for contact by X-rays when discharged through said aperture of said principal shield.

This invention pertains to an X-ray film holder and shield. More particularly, it pertains to connecting means to detachably secure a conventional X-ray film, preferably of the periapical type, to a film support member of an X-ray shield and aiming device of the type, for example, comprising the subject matter of U.S. patent application Ser. No. 386,205, filed July 30, 1964, in the name of Fred M. Medwedeff, now Patent No. 3,304,422, issued Feb. 14, 1967.

In the X-ray film shield and aiming device of the type described in said aforementioned application, a sheet-like metallic film-holding member is mounted in spaced relationship to the plate like shield member, but axially aligned with the opening in the shield member through which the desired X-rays pass for contact with an X-ray film, especially of the periapical type. The film is held in operative position by the supporting member connected to said shield by bracket means. The preferred means employed in commercial holders and shields based upon said application for connecting or attaching the X-ray film to the film supporting member comprises a pair of small ears integral with the opposite side edges of the film supporting member.

Said commercial version of film supporting member, especially for purposes of ready sterilization, strength, and also capability of absorbing X-ray to prevent passage of any appreciable amount therethrough, is formed preferably from stainless steel of suitable thickness, or some comparable or equivalent type of metallic alloy, which, at most, will permit only a very small percentage of the X-rays impinged against said supporting member to pass therethrough and thus subject the patient to direct contact by that percentage of X-rays which pass through the supporting member. As is well-known, lead will absorb substantially 100% of X-rays projected against the same but, being a relatively soft metal, lead is not very suitable for the purposes of forming a simple, self-supporting film supporting member therefrom in accordance with the desired principles of said aforementioned application.

It also is desired to form the combination shield and aiming device comprising the subject matter of said aforementioned application from a suitable metallic alloy, such as stainless steel, for purposes of minimizing the cost of forming the same, simplifying the structure, facilitating the fabrication of the several elements of the composite structure, and also provide a combination shield and aiming device which is capable of absorbing a very high percentage of X-rays impinged against the same while also providing a structure which readily can be sterilized by conventional means such as an autoclave, so-called cold sterilizing solutions, and the like.

In forming the small, inwardly bent ears upon the film supporting member of the shield and aiming device of the above-described commercial type, it has been found that the hardness and stiffness of stainless steel is such that many of the ears break from the supporting member before being completely shaped as desired. Also, suitably spacing the outer portions of said ears from the face of the supporting member which is engaged by the X-ray film is relatively difficult so as to be uniform in regard to accurate position and spacing between successive instruments made in accordance with mass production principles. Accordingly, elimination of said ears and substitution of an appropriate and preferably simple connecting means for detachably securing the X-ray film in operative position with respect to the substantially non-X-ray transmitting film supporting member has led to the development of the present invention.

It is a principal object of the present invention to provide relatively simple and inexpensive connecting means which can be either arranged movably with respect to a preferably conventional periapical type X-ray film having the normal paper wrapper or cover thereon, or the connecting means can be connected to the paper wrapper in accordance with another embodiment of the present invention, said connecting means readily being connected to or associated with a preferably planar type X-ray supporting member connected to the outer end of a bracket arm affixed to the combination shield and aiming device of the type described above and basically covered by said aforementioned application Ser. No. 386,205.

Another object of the invention is to provide a connecting means for detachably securing periapical type X-ray film to the aforementioned X-ray supporting member by relatively simple band-like paper strips of which several embodiments may be utilized conveniently and inexpensively in accordance with the principles of the invention described hereinafter.

A further object of the invention is to utilize layers or coatings of limited area of preferably pressure-sensitive cement affixed to one panel of the paper wrapper of conventional periapical type X-ray film in order that said cement may effectively but detachably connect the X-ray film to the surface of the film supporting member of the type referred to which is closest to the shield member, whereby the X-ray film may be held in operative position effectively with respect to the opening in the X-ray shield member, and particularly in axial alignment therewith.

A still further object of the invention is to provide several additional embodiments of connecting means comprising pockets coextensive with at least one surface of the film wrapper and having an open end to receive the film supporting member. In one of these embodiments, the pocket-forming means actually comprises part of the wrapper for the film and a pull-strip is provided to separate the wrapper into portions readily removable from the film following exposure thereof. Another of said additional embodiments utilizes a pull-strip comprising part of the pocket and which is attached to the conventional pull-tab of a standard type of X-ray film wrapper so as to facilitate opening said wrapper for separation from the film after exposure thereof.

Still another object of the invention is to provide a different type of supporting bracket arm and film supporting member for connection to the X-ray shield and aiming member of the type shown in said aforementioned application so as to simplify construction and render the film supporting member more effectively adapted for use therewith of the X-ray film connecting means of the aforementioned types.

Details of said objects and of the invention are set forth in the following specification and illustrated in the accompanying drawings comprising a part thereof.

In the drawings:

FIG. 12 is a fragmentary perspective, exploded view of another embodiment of film connecting means from those shown in the preceding figures.

FIG. 13 is a side elevation of the embodiment shown in FIG. 12, the method of opening the film wrapper being shown in phantom.

FIG. 14 is a face view of the film embodiment of FIGS. 12 and 13.

FIGS. 15 and 16 are views similar to FIGS. 12 and 14 but showing another shape of X-ray film.

FIGS. 17 and 18 are perspective views of another embodiment of X-ray film and connecting means in which the latter is part of the film wrapper and respectively showing the film in closed and opened positions.

FIGS. 19 and 20 respectively are views similar to FIGS. 17 and 18 but illustrating a different shape of film.

For details of the principal purpose and advantages of the X-ray shield and aiming member embodied in the present invention and described in detail hereinafter, attention is directed to said aforementioned application. Essentially, as hereinabove indicated, the present invention comprises an improvement over the structure shown in said aforementioned application, particularly by providing a more simplified bracket means, film supporting member connected thereto, and film connecting means by which especially periapical type X-ray film is detachably connected to the film supporting means.

Figure 1:
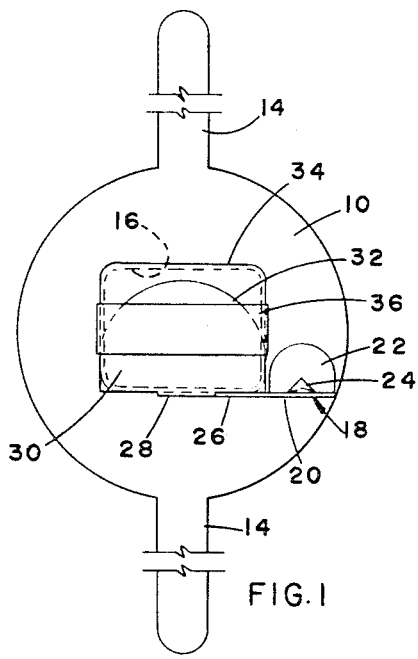
FIG. 1 is a rear vertical elevation, partly foreshortened, of a combination X-ray shield and aiming device embodying one embodiment of the present invention and showing a periapical type film connected to the film supporting member in accordance with the principles of the present invention.

Referring to FIG. 1, the combination X-ray shield and aiming member 10 preferably is stamped from sheet stock of suitable gauge stainless steel or the equivalent, which is capable of absorbing nearly 100% of the X-rays impinged thereupon. The main body of the member 10 preferably is circular, especially for purposes of being complementary to and covering the outer end 12 of a long cone connected to a conventional X-ray machine and capable of directing X-rays therefrom toward a patient. The fragmentary outer end 12 of such X-ray machine is illustrated in exemplary manner in FIG. 3.

Extending diametrically from opposite locations on the periphery of the shield and aiming member 10 is a pair of supporting arms 14, one of which is held by the patient during use to support the shield in operative position exteriorly of the patient's cheek or lips in conjunction with other parts of the assembly to be described hereinafter. For purposes of simplicity, the combination X-ray shield and aiming member 10 shall be hereinafter referred to simply as an X-ray shield.

Substantially centrally of the shield member 10 is a rectangular opening 16 which can be very simply formed therein by a stamping operation, either at the time the member 10 is stamped or blanked from sheet material, or as a subsequent operation. The opening 16 is approximately of the same size and shape of periapical type X-ray film to be used in connection with said shield. Accordingly, in the preferred manner of use of the present invention, a limited number of shields 10 will be furnished as a set to a dentist or X-ray laboratory, each shields to the various different sizes and shapes of conopening 16 therein for purposes of adapting the set of shields to the various dicerent sizes and shapes of conventional X-ray film normally employed in the average dental office or X-ray laboratory, as well as being furnished in sets having arms suited for use respectively with the left and right cheeks of a patient.

A relatively simple form of bracket 18 is connected to the shield member 10. In plan view, the bracket 18 comprises an arm 20 which is stamped from appropriate sheet metal of suitable gauge, preferably stainless steel or the equivalent, and one end 22 comprises an ear which is bent at a right angle to the plane of the arm 20 and is affixed to the surface of the shield member 10 which is disposed closest to the face of the patient. Appropriate spot welding is suitable to effect such connection. To render the arm 20 relatively rigid with respect to the shield member 10, an appropriate bracing dent 24 is formed in the arm adjacent the bend which connects it to the ear 22.

The arm 20 is provided midway of its end with a lateral offset 26, the offset being toward the axis of the opening 16 in the shield member 10, whereby the outer end 28 of arm 20 preferably is substantially axially aligned with the opening 16 in plan view. Preferably integral with the terminal extremity of the outer end 28 of arm 20 is a film supporting member 30, which is bent at right angles to the plane of the arm 20 so that when the arm is connected to the shield member 10, the film supporting member 30 will be parallel to said shield member and substantially aligned axially therewith. To accomplish this, the arm 20 is disposed within a plane substantially coextensive with the lower edge of the opening 16, as viewed in vertical elevation as shown in FIG. 1. Also, the ear 22 is adjacent one side edge of the opening 16, whereby substantially no metal is interposed between the perimeter of the opening 16 and the perimeter of the film supporting member 30 in directions parallel to the axis of the opening 16.

As shown in FIG. 1 in particular, the upper edge 32 of film supporting member 30 is arcuate, especially to facilitate the attachment of film connecting means described hereinafter in detail. Also, the width of supporting member 30 is substantially equal to the corresponding length of the opening 16, as can be seen from FIG. 1, and the area of member 30 is equal at least to the major portion of the area of the opening 16, whereby any X-rays projected through the opening 16 toward the film supporting member 30 will be stopped from passing through the member 30, that is, such X-rays will be absorbed by the member 30 and thereby minimize the possibility of danger to the patient by being subjected to X-rays which otherwise would pass through the supporting member 30.

An exemplary shape and size of preferably periapical type X-ray film 34 is illustrated in FIG. 1 as being supported in operative position with respect to the member 30. It will be seen that the size and shape of the film 34 is substantially equal to that of the opening 16. From FIG. 1, it also will be seen that the lower edge of the film 34 abuts the outer end 28 of arm 20 so as to position the film accurately with respect to supporting member 30 and thereby align the film in a vertical direction with respect to the axis of the opening 16. From FIG. 3 particularly, it also will be seen that the film 34 is disposed against the surface of supporting member 30 which is nearest the shield 10 and is coextensive in length therewith.

To suitably connect the film 34 to the supporting member 30, and especially to prevent transverse movement between the two, suitable connecting means embodying the principles of the present invention are utilized. A number of embodiments of such means are illustrated in the drawing and the details thereof are described hereinafter. One such embodiment of connecting means 36 is shown in FIGS. 1 and 3–5.

Connecting means 36 preferably comprise a strip of paper-like material of substantially uniform width and of suitable length that the ends 38 thereof are folded inwardly and are secured by appropriate cement, for example, to one wall of the paper wrapper which is of conventional type and encloses the sheet of X-ray film per se enclosed within the composite, commercial type of film 34 illustrated in the aforementioned figures. By simply sliding the upper edge 32 of the supporting member 30 between the band-like connecting means 36 and the wrapper of X-ray film 34, a highly effective detachable connection of the film to the supporting member 30 is effected.

When the film 34 has been so attached to the supporting member 30, the assembled film and supporting member, as well as the offset portion 26 of the arm 20 are inserted within the oral cavity 40 of the patient and the outer end 28 of the arm is gripped between the upper and lower teeth of the patient, said teeth being generally identified by the numeral 42. The offset portion 26 of the arm will be disposed adjacent the cheek 44 of the patient and the lips 46 will be disposed adjacent the upper and lower surfaces of the offset portion 26 of the arm. It thus will be seen that the X-ray film 34 is disposed closely adjacent the inner surfaces of the teeth 42. In the event the upper or lower teeth are to be X-rayed, the assembly is mounted within the oral cavity 40 so that the film connected to the supporting member 30 is disposed adjacent either the upper or lower teeth, depending upon which individual tooth or group of teeth thereof are to be subjected to X-rays.

The offset arrangement of the arm 26 provides comfort to the patient through minimizing the amount of stretching of the mouth which will have to be accomplished in order to dispose the X-ray film and supporting member 30 opposite the rearmost molars, for example. These will be the teeth which otherwise would provide the greatest discomfort in the use of a shield and X-ray film supporting means having no such offset in the arm. The same device is used with ease for providing X-ray images of the front or anterior teeth to X-rays. This simple form of arm 20 and the manner in which it is connected to the shield 10, as well as the manner in which the supoprting member 30 is connected to it, comprises a substantial advantage over the method of forming the equivalent structure, and especially the film connecting means comprising the subject matter of said aforementioned application.

Figure 3:
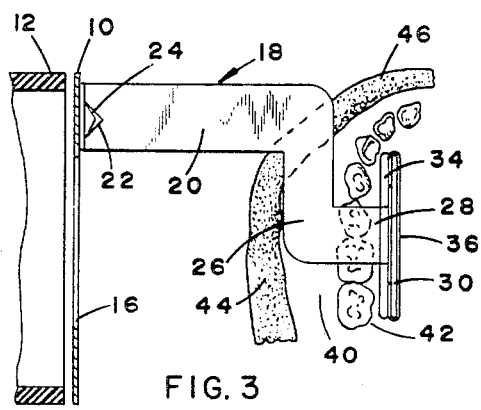
FIG. 3 is a top plan view of the embodiment of the invention shown in FIG. 1 and illustrated in a fragmentarily illustrated portion of a human oral cavity, a fragmentary portion of the outer end of a long type X-ray cone also being shown.
Figures 4, 6:
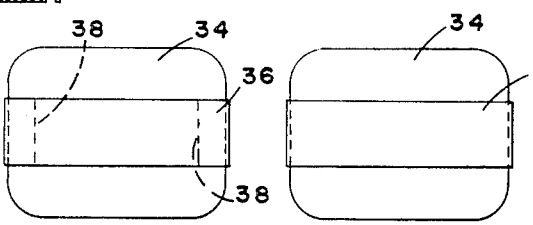
FIG. 4 is a plan view of one embodiment of connecting means embodying the principles of the present invention.
FIG. 6 is a plan view of a periapical type X-ray film having another embodiment of film connecting means associated therewith which embodies the principles of the present invention.
Figures 5, 7:
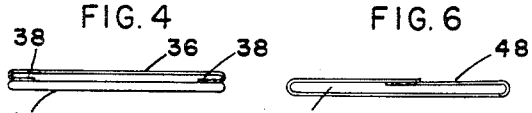
FIG. 5 is an edge view of the X-ray film and embodiment of connecting means illustrated in FIG. 4.
FIG. 7 is an edge view of the X-ray film and connecting means illustrated in FIG. 6.

Additional embodiments of film connecting means are illustrated in other figures which will now be described in detail. Referring to FIGS. 6 and 7, it will be seen that the connecting means 48 simply comprises an endless band of paper-like strip material which is of suitable size that when a conventional periapical type X-ray film unit or package 34 is placed adjacent the inner face of the supporting member 30, such as illustrated in FIGS. 1 and 3, the endless, flat loop-type connecting member 48 may be slid frictionally around the opposite edges of the film and supporting member and will frictionally engage such edges so as to securely but removably connect the film to the supporting member 30.

Figure 2:
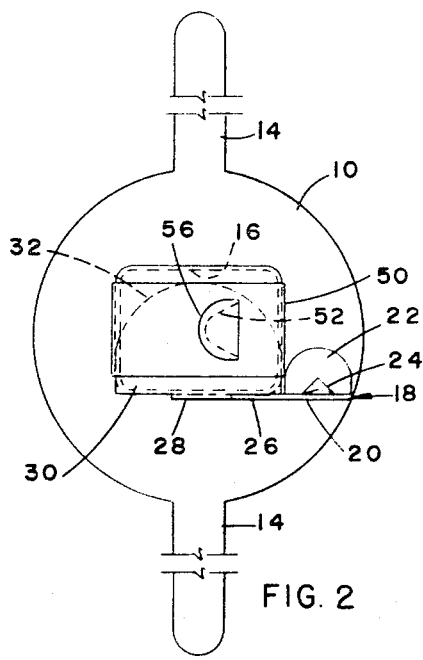
FIG. 2 is a view similar to FIG. 1, but illustrating another embodiment of film connecting means illustrated in engagement with the film supporting member of the combination shield and aiming device.
Figure 8:
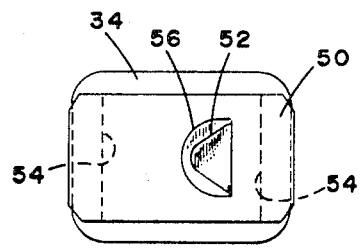
FIG. 8 is a plan view of still another embodiment of X-ray film and film connecting means associated therewith.
Figure 9:
FIG. 9 is an edge view of the embodiment of X-ray film and connecting means shown in FIG. 8.

Referring to FIGS. 2, 8 and 9, a still further embodiment of connecting means 50 is illustrated. This embodiment particularly is adapted to accommodate the conventional pull-tab 52 which is provided on at least one commercial type of X-ray film to facilitate removal of the paper wrapper from the sheet of X-ray film immediately prior to developing the same after it has been exposed to X-rays. Such an exemplary pull-tab is shown in FIGS. 8 and 9. The connecting means 50 also preferably is similar to the embodiment of connecting means shown in FIGS. 1 and 3–5, especially with respect to the means by which it is connected to the wrapper of the commercial type X-ray film 34. That is, the connecting means 50 preferably comprises a strip of paper-like material somewhat wider than the preceding embodiments of connecting means 36 and 48, and the opposite ends 54 thereof preferably are turned under the affixed by cement or otherwise to one panel of the wrapper of the X-ray film 34. The band 50 also is provided with an arcuate shaped opening 56 to which the pull-tab 52 readily extends, as can be seen in FIGS. 8 and 9. It will be understood that in FIG. 2, the pull-tab 62 will be rearward of the supporting member 30 and therefore not visible normally from the rear face of the assembly when the film is connected to the supporting member.

The embodiment of the invention shown in FIGS. 2, 8 and 9 has certain advantages in that, after the film has been exposed to X-rays, and has been removed from the supporting member 30 by sliding it upwardly therefrom, the pull-tab 52 is readily accessible to simultaneously rupture the connecting means 50 as well as the conventional wrapper of the X-ray film when it is desired to remove said wrapper for purposes of processing the film.

Figure 10:
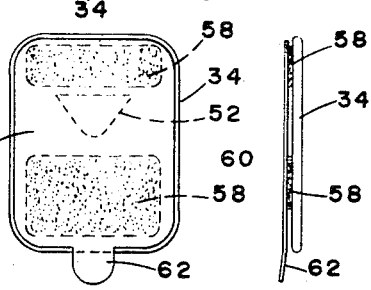
FIG. 10 is a plan view of a still further embodiment of X-ray film and connecting means embodying the principles of the present invention.
Figure 11:
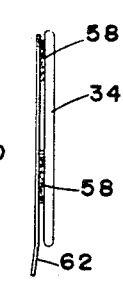
FIG. 11 is an edge view of the embodiment of X-ray film and connecting means shown in FIG. 10.

Still another embodiment of connecting means utilizing the principles of the present invention is illustrated in FIGS. 10 and 11. In this figure, the conventional X-ray lfim or package 34 comprising a wrapper enclosing the sheet of X-ray film is provided on one face thereof with a plurality of coatings 58, of limited area, of suitable cement. For practical purposes, appropriate pressure-sensitive cement is especially suitable to detachably secure the film 34 to the inner surface of the supporting member 30. Normally, the surface of the X-ray film package or unit 34 which is to be exposed to the X-rays is opposite that which has the pull-tab 52 thereon. Hence, the areas of cement 58 will be affixed to the same surface of the X-ray film package or unit 34 as that which has the pull-tab 52 thereon.

For purposes of maintaining the cement 58 always ready for use and in tacky condition, the coatings or areas thereof affixed to the film 34 normally are covered and maintained protected against exposure to the atmosphere by means of a suitable cover sheet 60 of suitable size to amply cover the areas of cement 58 as readily can be seen from FIG. 10. Suitable material for the cover sheet comprises varnished paper or the like. Further, to facilitate removal of the sheet from the cement, an appropriate ear or pull-tab 62 may be provided on one end thereof, as shown in FIGS. 10 and 11.

In the first three embodiments of the invention comprising the bands of paper-like material, it will be understood that the dimensions thereof are such that the looped opposite end of the connecting means are spaced apart a distance which will enable the same to frictionally engage the opposite ends of the supporting member 30 so as firmly and accurately to hold the X-ray film in operative relation with respect to the supporting member 30. Such arrangement, however, will permit ready removal of the film from the supporting member simply by engaging the opposite ends of the film between the thumb and finger of the operator, for example, and slidably pulling the film and connecting means from the supporting member 30.

In addition to the various embodiments of connecting means described hereinabove and illustrated in FIGS. 1–11, several additional embodiments of connecting means, closely related to each other, also are capable of being used advantageously with these types of combination X-ray film holder and shield members, and especially the film supporting member 30 thereof. These additional connecting means are illustrated in various manners in FIGS. 12–20 and details of the same now will be described.

It will be appreciated particularly by comparing FIG. 12 with FIGS. 1 and 2 of the drawings that, especially when X-ray photographs of posterior or rear teeth are to be made for study of either a single or a number of adjacent teeth, the substantially rectangular film, as well as the supporting member 30 adapted to be used with any predetermined size and shape of said film are disposed with the longer axis of the film and supporting member extending horizontally, particularly since the positioning of such film and supporting member within the oral cavity for the photographing of posterior teeth is closer to a condyle. Accordingly, greater comfort will be afforded a patient if the vertical dimension of the film is minimum under such circumstances.

In taking X-ray photographs of anterior or front teeth, however, no appreciable discomfort is experienced by the patient if rectangular film is disposed within the oral cavity, adjacent the lingual surfaces of the anterior teeth with the longer axis of the film disposed vertically because greater vertical opening movement of the mouth may be accomplished with a minimum movement of the patient's mandible or lower jaw than in regard to taking X-rays of posterior teeth. Hence, as illustrated in FIGS. 12–14, the fragmentarily illustrated portion of the bracket 18, which preferably is similar to that illustrated in FIGS. 1–3, is connected at its outer end to the lower edge of a film supporting member 64 which has a greater vertical dimension, in use, than the horizontal dimension thereof.

As in regard to the preceding embodiment, the upper edge of the film supporting member is curved to facilitate the reception thereof within connecting means affixed to the film. Correspondingly, the X-ray film 68, which is of a conventional type and shape and enclosed within a substantially conventional wrapper, is rectangular but the vertical dimension thereof in use is greater than the horizontal dimension thereof.

In accordance with the principles of the present invention, the film 68 also is provided with an additional embodiment of connecting means comprising a sheet of nonmetallic material 70, such as paper or the like, but preferably of reasonably durable type, that is secured at the upper and vertically extending side edges, such as by overlapping flaps or the like, to the corresponding edges of the normal wrapper of the X-ray film 68. Such connection, however, is such that the lower end 72 of sheet 70 is not secured to the film wrapper but, rather comprises an open end in the connecting means, resembling a slot, and comprising an opening to the flat pocket formed between the sheet 70 and the adjacent surface of the wrapper of the film 68. The open lower end 62 slidably receives the film supporting member 64 therein.

This embodiment also includes an additional feature different from the preceding ones in the form of a pair of preferably parallel rows of spaced incisions or perforations 74, which define therebetween a pull-strip 76. In the preferred construction thereof, the lower end 78 of said pull-strip comprises a finger-engaging portion and extending a short distance upward from the terminus of said lower end 78, at opposite sides thereof, the strip is defined by short slits 80 comprising actually the lower ends of the rows of incisions or perforations 74, thereby facilitating the gripping of the lower end 78 of the pull-strip 76.

Further, the above-described embodiment of the invention illustrated in FIGS. 12–14 includes conventional X-ray film 70 of the type having a pull-tab 82 thereon immediately beneath the pocket-forming sheet 70. The purpose of the pull-tab is to facilitate the removal of the wrapper from the X-ray film after the film has been exposed to a column of X-rays and incident to the film being developed by conventional procedure. To facilitate the operation of the pull-tab 82, the structure illustrated in said embodiment comprises applying a spot of cement 84, for example, to connect the pull-strip 76 with the pull-tab 82. Hence, after the film has been exposed and it is desired to remove the same from the conventional wrapper therefor, it is only necessary to manually pull the pull-strip 76 along the rows of perforations 74 until the strip is completely removed from sheet 70 except at the upper edge thereof. This is illustrated somewhat diagrammatically in FIG. 13 in side elevation, whereupon the pull-tab 82 likewise will be pulled to separate the film wrapper and thereby facilitate the removal of the wrapper from the exposed film.

The principles of the embodiment illustrated with respect to the structure in FIGS. 12–14 equally are adaptable to so-called horizontally extending film of which an example is illustrated in FIGS. 15 and 16, wherein the substantially conventional size and shape of rectangular but horizontal X-ray film 68' is shown having a pocket-forming sheet 70' connected thereto and provided with rows of perforations or incisions 74' to form a pull-strip 76'. Such horizontally arranged type of film 68' is attachable to a horizontally arranged film supporting member 64' connected to the outer end of the bracket 18.

As in regard to the embodiment of FIGS. 12–14, the embodiment shown in FIGS. 15 and 16 also includes the arrangement of the pocket of each embodiment formed respectively by the sheet 70 and 70' being so dimensioned with respect to the X-ray film to which they are connected that they quite snugly and respectively receive the vertically and horizontally arranged film supporting members 64 and 64'. Further, the embodiment shown in FIGS. 15 and 16 likewise includes a spot of cement 84' between the pull-strip 76 and the pull-tab 82' so that when the lower end 78' of the pull-strip is engaged and pulled to separate the same from the sheet 70', the latter portion of the removal of the pull-strip 76' from the sheet 70' results in actuating the pull-tab 82' to facilitate opening the wrapper of the X-ray film for removal from the film.

As has been described above, it is possible to combine part of the pocket-type film connecting means with the conventional wrapper opening means according to the embodiment shown in FIGS. 12–16. Further in accordance with the principles of the present invention, however, it additionally is possible to form a different type of wrapper-opening means than those normally employed while also including pocket-forming means in accordance with the present invention. In this regard, attention is directed to the details of FIGS. 17–20 of the drawings. In these figures, FIGS. 17 and 18 represent a so-called horizontal type of film, whereas FIGS. 19 and 20 represent a so-called vertical type of film.

Concerning first the embodiment shown in FIGS. 17 and 18, the wrapper 86 completely encloses the X-ray film 88 shown in FIG. 18, for example. Said wrapper may be formed from material similar to that from which conventional X-ray film wrappers presently are formed. As is usual in many types of X-ray film, the film 88, as shown in FIG. 18, has such a thin sheet of lead 90 overlying the forward surface thereof, as viewed in said figure, for purposes of preventing X-rays from passing through the film and into the interior of the oral cavity after suitable exposure of the film has been made to the X-rays. FIGS. 17 and 18 in this regard have been oriented with respect to each other and it will be understood that the film 88 and sheet of lead 90 are both enclosed within the wrapper 86 shown in FIG. 17.

In addition to the wrapper 88 which completely encloses the film 88 and lead sheet 90, for example, assuming that a lead sheet is used in accordance with conventional manufacturing practices for X-ray film, film-connecting means also are included on the wrapper 86 in the form of a pocket-forming sheet 92, which may be formed from the same type of material as the wrapper 86 if desired. The sheet 92 is secured at its upper and side edges to the wrapper 86, while leaving the lower edge 94 thereof open so as to provide an opening for the pocket formed between the sheet 92 and the wrapper 86 for reception of the film supporting member 64', for example. This is shown in FIG. 15 wherein the film is supported in operative position with respect to the X-ray shield member which, it will be understood, is mounted at the opposite end of the bracket 18 from that which supports the film supporting members 64 and 64' respectively shown in The wrapper 86, as well as the pocket-forming sheet 92, are both provided with parallel rows 96 of incisions or perforations similar, for example, to those in rows 74 and 74' illustrated in the preceding embodiments shown in FIGS. 12–16. Said rows of incisions or perforations define overlying pull-strips 98 respectively formed in the front and rear sheets of wrapper 86 as well as pocket-forming sheet 92.

Referring to FIG. 17, it will be seen that the lower end 100 of the outermost pull-strip 98 formed in sheet 92 terminates in a finger-engaging portion, while the lower end 102 of the inner pull-strip 98', as shown in FIG. 17, lies directly beneath the lower end 100 of the outer pull-strip and, with the same, forms a composite finger-engaging portion for both pull-strips.

When it is desired to open the wrapper 86 to separate the same from the film 88 as well as the sheet of lead 90, if any is included therewith, following exposure of the film and immediately prior to developing the same, the lower ends 100 and 102 of the overlying pull-strips 98 and 98' are pulled inwardly as considered with respect to FIG. 17. When the upper edge of the film is reached, the sheet 92 will have been severed, together with the front panel of wrapper 86, as viewed in FIG. 17. By continuing to pull the composite pull-strips downwardly across the rear panel of wrapper 86, with respect to which only pull-strip 98' exists, it will be seen that wrapper 86 will have been severed into the 2 halves, shown in exploded manner in FIG. 18, in which view the same have been removed from opposite ends of the film 88 and lead sheet 90.

Referring to FIGS. 19 and 20, the same principles are embodied in the wrapper 86' as in the wrapper 86 of FIGS. 17 and 18, except that the film 86' is arranged to comprise a so-called vertical type film, used particularly for taking X-ray photographs of anterior teeth. In this additional embodiment, a pocket-forming sheet 92' is connected at its top and side edges to the wrapper 86', thus being open at the bottom edge 94' to form an opening to the flat pocket for snug reception of the film supporting member 64, for example, as shown in FIG. 12.

Rows 96' of incisions or perforations, similar to rows 96 thereof in FIG. 17, are included in the vertical type film of FIG. 19 to provide an outer pull-strip 98" in the pocket-forming sheet 92', while an inner pull-strip 98'" is formed in opposite front and rear panels of the wrappers 86', for example. Hence, when the lower outer ends 100' and 102' of the pull-strips are engaged manually and are pulled to sever the sheet 92' and the front and rear panels, as well as the upper edge of wrapper 86', the opposite end portions of the wrapper 86' will be separated from each other and may be removed from opposite end portions of the film 88' and lead sheet 90', if used, as shown in FIG. 20, so as to gain access to said film for developing purposes following exposure thereof to X-rays.

While the invention has been described and illustrated in its several preferred embodiments, it is to be understood that the invention is not to be limited to the precise details herein illustrated and described since the same may be carried out in other ways falling within the scope of the invention as claimed.

We claim:

1. An X-ray film holder comprising in combination, plate-like X-ray shield and aiming means arranged to be positioned exteriorily of a patient's face and adjacent the outer end of the cone of an X-ray machine, said shield and aiming means having an opening of restricted size therethrough of substantially similar shape and size to that of an X-ray film to be used with said holder to effect collimation of X-ray beams, a rigid bracket arm connected at one end to one face of said shield and aiming means and extending substantially perpendicularly therefrom, a rigid metallic plate-like film supporting member connected adjacent one edge thereof to the outer end of said arm and arranged substantially perpendicularly thereto and parallel to said shield and aiming device and positioned by said arm substantially in axial alignment with the center of said opening, a pair of the opposite edges of said film supporting member being substantially parallel to each other and unobstructed for the full length thereof, and a combination X-ray film and connecting means attachable to said film supporting member and including a substantially rectangular periapical type X-ray film comprising a disposable wrapper enclosing a sheet of sensitized film, said film wrapper having one transverse dimension substantially equal to the transverse dimension of said film supporting member between said unobstructed opposite edges thereof and said connecting means comprising a band of non-metallic pliable material extending flatly across the face of said film wrapper which is positioned against one face of said film supporting member, the ends of said band of material being folded substantially 180° relative to the intermediate portion of said band and secured to said X-ray film wrapper and operable therewith to form ends of a slot which tightly receives said film supporting member therein to position it between said film face and band of material by said ends of said band of material accurately and slidably engaging said opposite unobstructed side edges of said film supporting member and thereby dispose said film in axial alignment with said opening in said X-ray shield and aiming means.

2. The X-ray film holder according to claim 1 in which said film wrapper has a pull-tab to facilitate opening the same and said band has an opening therein for access to said pull-tab.

3. The X-ray film holder according to claim 1 in which said band of said connecting means is substantially coextensive in size and shape to one surface of said film wrapper and is connected to all edges of said wrapper except along one edge to provide an opening at said edge of the film wrapper and thereby form a pocket slidably to receive said film supporting member to detachably connect said film thereto.

4. The X-ray film holder according to claim 3 in which said pocket-forming means is a sheet of material having means defining a pull-strip operable when pulled to separate said sheet into portions to facilitate removal of said wrapper from said film after exposure thereof to X-rays.

5. The X-ray film holder according to claim 4 in which said film wrapper has a pull-tab operable when pulled to open said wrapper for access to said film and said pull-strip being connected to said pull-tab to operate the same to open said wrapper when said strip is pulled from said pocket-forming sheet.

6. A combination periapical type X-ray film and connecting means attachable to a plate-like film supporting member connected to an X-ray shield and aiming means and comprising a substantially rectangular disposable X-ray film wrapper enclosing a correspondingly shaped sheet of sensitized film, said film wrapper having one transverse dimension substantially equal to one transverse dimension of a film supporting member with which it is connectable, and connecting means comprising a band of non-metallic pliable material extending in the direction of said transverse dimension across one face of said wrapper, the opposite ends of said band being folded substantially 180° relative to the intermediate portion of said band in parallelism therewith and secured to said film wrapper to form a slot between said band and adjacent face of said wrapper having a length coextensive with said wrapper and adapted to tightly and slidably receive therein a film supporting member of the type described for accurate and quick-detachably positioning of said combination X-ray film and connecting means thereon.

7. The X-ray film and connecting means according to claim 6 in which said band is wrapped around the ends of said film wrapper.

8. The X-ray film and connecting means according to claim 6 in which said folded ends of said band are affixed to the same surface of said wrapper which said band extends across.

9. The X-ray film and connecting means according to claim 6 in which said band comprises a sheet substantially coextensive in size and shape to said wrapper and connected at three edges of said band to said wrapper and thereby forming a pocket open at one edge to receive a film supporting member slidably therein.

10. The X-ray film and connecting means according to claim 9 in which said sheet has weakening means defining a pull strip operable when pulled to separate said sheet into portions to facilitate removal of said wrapper from said film after exposure thereof to X-rays.

References Cited
UNITED STATES PATENTS

| | | | |
|---|---|---|---|
| 1,698,795 | 1/1929 | Hillman | 250—70 |
| 2,075,491 | 3/1937 | Wilson | 250—70 X |
| 2,112,816 | 3/1938 | Rulon | 250—69 |
| 3,092,721 | 6/1963 | Medwedeff et al. | 250—70 |
| 3,304,423 | 2/1967 | Medwedeff | 250—70 |

WILLIAM F. LINDQUIST, Primary Examiner

U.S. Cl. X.R.

250—69